Aug. 28, 1951 A. H. MIDGLEY 2,566,238
DYNAMOELECTRIC MACHINE
Filed June 30, 1948

Inventor
A. H. Midgley
By Glascock Downing Leibold
attys.

Patented Aug. 28, 1951

2,566,238

UNITED STATES PATENT OFFICE 2,566,238

DYNAMOELECTRIC MACHINE

Albert Henry Midgley, Northwood, England

Application June 30, 1948, Serial No. 36,009
In Great Britain July 4, 1947

4 Claims. (Cl. 172—36)

This invention relates to electric motors and generators and while capable of general application is primarily intended for small fractional horse power motors or generators particularly as used in toys.

The principal object of the present invention is to provide a construction which will be extremely cheap to produce and which may when necessary or desirable be such that it may be readily built up from its components by a child or by anyone not possessed of any special skill.

The invention consists in a dynamoelectric machine comprising a field magnet, an armature rotatable in the field produced thereby and wound with a coil or coils, the turns of which are in planes at right angles to the axis of rotation, and a commutator, the segments of which are connected to the ends of the armature coil or coils.

Further features of the invention will be apparent from the description given hereafter.

The accompanying drawings illustrate two modes of carrying out the invention.

In carrying my invention into effect in one of its simplest forms when producing a small fractional motor intended for use with toys and as illustrated in Figures 1 to 4, I form the motor with two pole pieces $a$ held between brass or other suitable frames or plates $b$ having slots therein co-operating with lugs $c$ on the ends of the pole pieces so that the parts may be assembled securely together. The pole pieces are connected at one end by a yoke $d$ round which the field coil $e$ is wound and they may be spaced apart by a bracket plate $f$ providing, in combination with one of the end brackets $b$, bearings in which is mounted the shaft $g$ of a two-pole armature wound with a coil $h$, the turns of which are in planes at right angles to the axis of rotation, the ends of the coil being connected to a two part commutator $i$ carried upon the armature shaft. The pole pieces $k$ of the armature may be in the form of segments mounted upon the shaft and each having a portion shrouding the armature coil and subtending an angle of about 90°. The end brackets $b$ may also carry a fibre or other insulating plate $l$ having a switch $m$ with appropriate connections for the field coil $e$ and two brushes $n$ co-operating with the commutator $i$.

In a modification of the invention the field may be produced by a permanent magnet in the form of a sleeve surrounding the armature and magnetised so as to give north and south poles.

In other modifications I may form my improved machine with a three-pole armature rotatable in a two-pole field, and a two part commutator, or I may provide a three-pole armature with two coils and a three-part commutator, the armature rotating within a two-pole field, there being two brushes 180° apart. Alternatively, the three-pole armature may be associated with a four-part commutator although this is not quite such a good machine as that formed with the three-pole armature and a three-part commutator.

For very small machines the poles of the armature may be formed of sectors mounted upon the armature and set at 180°, 120°, or other angle depending upon the number of poles, and in the case of a three-pole armature, for example, the poles may be separated by the two coils provided.

Figure 1:
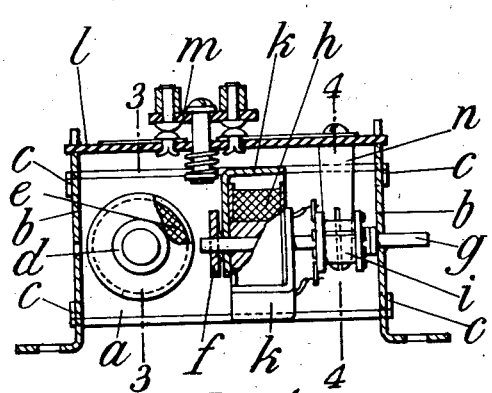
Figure 1 is a longitudinal sectional elevation of one form of motor in accordance with the invention.
Figure 3:
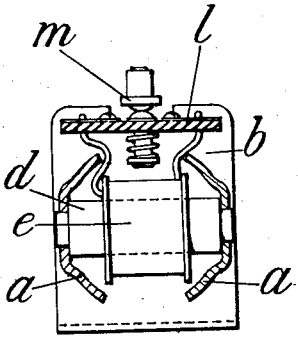
Figure 3 is a section on the line 3—3 of Figure 1.
Figure 2:
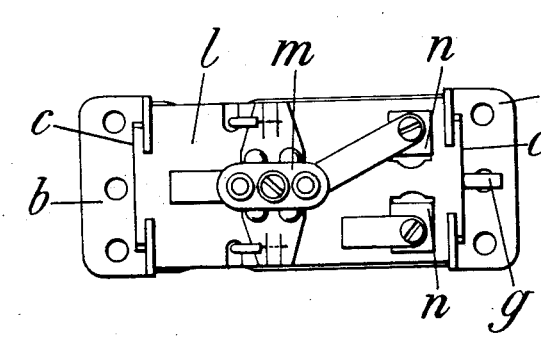
Figure 2 is a plan.
Figure 4:
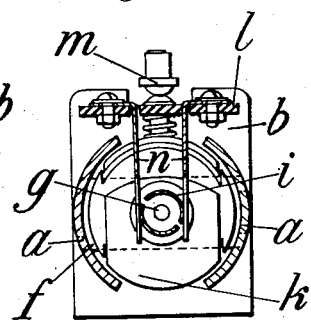
Figure 4 is a section on the line 4—4 of Figure 1.
Figure 5:
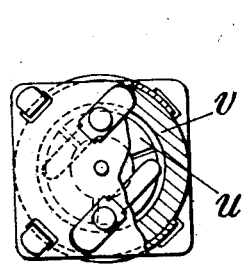
Figure 5 is a part sectional end view of a second form of motor.
Figure 6:
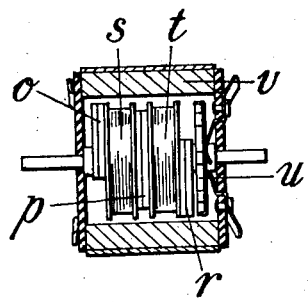
Figure 6 is a longitudinal section of Figure 5.

Figures 5 and 6 show a form of the last mentioned modification in which the armature poles are shown at $o$, $p$ and $r$ set at 120° with respect to each other, the coils at $s$ and $t$, and the three-part commutator at $u$. In this case the field is produced by the permanent magnet $v$ constructed as above referred to.

Each pole may subtend any desired angle, and in all modifications of the invention it will be understood that the armature coils are wound with the turns in planes at right angles to the axis of rotation of the armature. The armature coils may be gripped between the poles or they may be cemented to the armature core or the latter may be of polygonal form or any other arrangement may be adopted to ensure that the armature core and coils rotate together.

It will further be understood that the foregoing details of construction are given purely by way of example to indicate the nature of the invention and not to limit its scope since the invention may be equally applied to multi-polar machines in which case the poles of the armature, instead of being each in the shape of a segment of a disc as above described, would be subdivided so as to have the equivalent of a segment for each pair of poles in the field. For example, in a four-pole machine there would be two like poles at opposite ends of a diameter to each of the three-pole pieces while in a six-pole machine there would be three pairs of like poles at 120°, and so on. In each case the armature would still have two coils or their equivalent but the number of segments of the commutator would be three for each pair of poles and they would be cross-connected.

I claim:

1. A small dynamo-electric machine comprising an armature shaft wound with at least one coil secured thereto the turns of which are coaxial with the axis of rotation of the armature and the ends of which are respectively connected to different segments of a commutator carried on the armature shaft, segmental armature pole pieces mounted on the armature shaft one pole piece on each side of the coil, the respective armature pole pieces being mutually displaced about the axis of rotation so as to have equally spaced angular locations with respect to the axis of rotation of the shaft, and a field magnet adapted to produce alternate magnetic poles around the axis of rotation of the armature, each field magnet pole extending parallel to the axis of rotation of the armature so as to co-operate with each armature pole piece.

2. A small dynamo-electric machine as claimed in claim 1, in which each segmental armature pole piece has a spaced segment for each pair of opposite field magnet poles.

3. A small dynamo-electric machine comprising an armature shaft wound with a coil secured thereto the turns of which are coaxial with the axis of rotation of the armature and the ends which are respectively connected to the segments of a two-segment commutator carried on the armature shaft, single segment armature pole pieces mounted on the armature shaft one pole piece on each side of the coil, the respective armature pole piece segments being oppositely located with respect to the axis of rotation of the shaft, and a field magnet adapted to produce around the axis of rotation of the armature a north and a south pole set at 180° to one another, each field magnet pole extending parallel to the axis of rotation of the armature so as to co-operate with each armature pole piece.

4. A dynamo-electric machine comprising an armature shaft wound with two coils the turns of which are coaxial with the axis of rotation of the armature and the ends of each of which turns are respectively connected to separate segments of a three-segment commutator carried on the armature shaft, one particular segment only of the commutator being connected to an end of each of the coils, three single segment armature pole pieces mounted one between the two coils and one on each side of the coil assembly, the respective segments being located at 120° spacing around the axis of rotation, and a field magnet adapted to produce around the armature a north and a south magnetic pole set at 180° to one another with respect to the axis of rotation, each field magnet pole extending parallel to the axis of rotation of the armature so as to co-operate with each armature pole piece.

ALBERT HENRY MIDGLEY.

REFERENCES CITED

The following references are of record in the file of this patent:

UNITED STATES PATENTS

| Number | Name | Date |
| --- | --- | --- |
| 501,842 | Long | July 18, 1893 |
| 1,715,311 | Sperry | May 28, 1929 |
| 2,045,729 | Ruppe | June 30, 1936 |
| 2,070,790 | Hammes | Feb. 16, 1937 |
| 2,177,472 | Barrett | Oct. 24, 1939 |
| 2,391,005 | Bryant | Dec. 18, 1945 |
| 2,446,290 | Lovegrove | Aug. 3, 1948 |
| 2,466,267 | Pace | Apr. 5, 1949 |

FOREIGN PATENTS

| Number | Country | Date |
| --- | --- | --- |
| 25,221 | Great Britain | of 1894 |
| 165,514 | Great Britain | June 24, 1921 |